(12) United States Patent
Kwak et al.

(10) Patent No.: US 6,862,069 B2
(45) Date of Patent: Mar. 1, 2005

(54) LIQUID CRYSTAL DISPLAY DEVICE AND FABRICATING METHOD THEREOF

(75) Inventors: Dong Yeung Kwak, Daeku-shi (KR); Soon Sung Yoo, Kumi-shi (KR); Yu Ho Jung, Kumi-shi (KR); Hu Sung Kim, Seoul (KR); Dug Jin Park, Daeku-shi (KR); Yong Wan Kim, Kumi-shi (KR); Woo Chae Lee, Seoul (KR)

(73) Assignee: LG.Philips LCD Co., Ltd., Seoul (KR)

(*) Notice: Subject to any disclaimer, the term of this patent is extended or adjusted under 35 U.S.C. 154(b) by 83 days.

(21) Appl. No.: 09/750,246

(22) Filed: Dec. 29, 2000

(65) Prior Publication Data

US 2001/0022639 A1 Sep. 20, 2001

(30) Foreign Application Priority Data

Dec. 31, 1999 (KR) .......................... P1999-68136

(51) Int. Cl.⁷ ..................... G02F 1/1343; G02F 1/1339

(52) U.S. Cl. ........................................ 349/143; 349/153
(58) Field of Search ................................ 349/153, 143, 349/139, 149, 43

(56) References Cited

U.S. PATENT DOCUMENTS

| 5,285,301 | A | * | 2/1994 | Shirahashi et al. | 349/111 |
| 5,982,470 | A | * | 11/1999 | Nakahara et al. | 349/139 |
| 5,995,189 | A | * | 11/1999 | Zhang | 345/206 |
| 6,172,732 | B1 | * | 1/2001 | Hayakawa et al. | 349/139 |
| 6,476,901 | B2 | * | 11/2002 | Fujioka et al. | 349/149 |

* cited by examiner

Primary Examiner—Toan Ton
(74) Attorney, Agent, or Firm—McKenna Long & Aldridge LLP (57) ABSTRACT

A liquid crystal display device includes dummy patterns formed between gate links and between data links. The gate links and data links are coated with a sealant to obtain the same height as a liquid crystal area at the opposite side thereof through the dummy patterns, providing a uniform cell gap.

27 Claims, 8 Drawing Sheets

CONVENTIONAL ART

LIQUID CRYSTAL DISPLAY DEVICE AND FABRICATING METHOD THEREOF

This application claims the benefit of Korean Patent Application No. 1999-68136, filed on Dec. 31, 1999, which is hereby incorporated by reference for all purposes as if fully set forth herein.

BACKGROUND OF THE INVENTION

1. Field of the Invention

The present invention relates to a liquid crystal display, and more particularly, to a liquid crystal display device and method that is capable of compensating for a step coverage at each location of a liquid crystal display panel.

2. Discussion of the Related Art

Generally, a liquid crystal display (LCD) controls light transmissivity of liquid crystal cells arranged in a matrix pattern in response to a video signal to thereby display a picture corresponding to the video signal on a liquid crystal display panel. An active matrix LCD device includes a liquid crystal display panel having liquid crystal cells arranged and driving integrated circuits (IC's) for driving the liquid crystal cells. The driving IC's are usually manufactured as semiconductor chips. Driving IC's for a tape automated bonding (TAB) system are mounted on a tape carrier package (TCP) while driving IC's for a chip on glass (COG) system are mounted on the surface of the liquid crystal display panel. The driving IC's of the TAB system are electrically connected to a pad portion provided at the liquid crystal display panel by the TCP.

Figure 1:
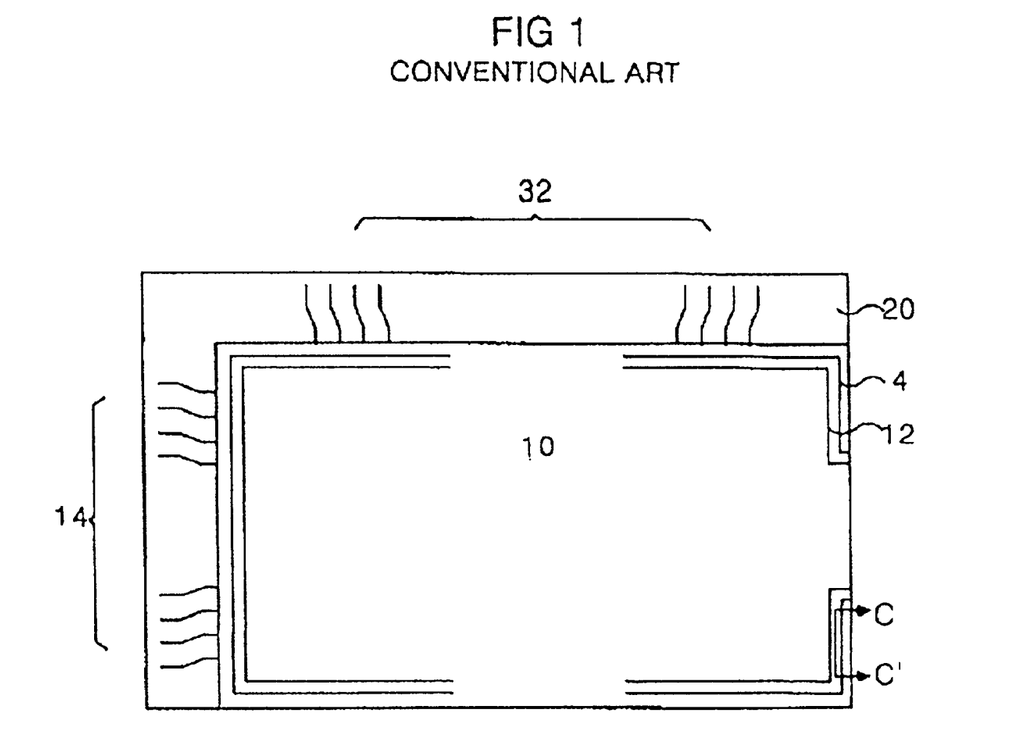
FIG. 1 is a schematic plan view showing a structure of a conventional liquid crystal display panel.

FIG. 1 is a plan view showing a conventional liquid crystal display panel. The LCD panel includes a lower plate 20 attached to an upper plate 4. In FIG. 1, the liquid crystal display panel includes a picture display part 10 having liquid crystal cells arranged in a matrix pattern. Gate pads 14 and data pads 32 are positioned at edges of the lower plate 20 without overlapping the upper plate 4 and connected to gate lines and data lines, respectively. In the picture display part 10, the data lines to each of which a video signal is applied and the gate lines to each of which a scanning signal, that is, a gate signal is applied are arranged in such a manner as to cross each other. At each of the crossing portions, a thin film transistor (TFT) is provided for switching the liquid crystal cell. A pixel electrode is connected to the TFT to drive the liquid crystal cell. The upper plate 4 is provided with a black matrix, color filters coated separately for each cell area and a common electrode that is a counterpart electrode to the pixel electrode. The upper plate 4 and the lower plate 20 are attached to each other by a sealant coated on a seal part 12 positioned at the periphery of the picture display part 10. A certain cell gap distance is defined between the upper plate 4 and the lower plate 20 by a height of the coated sealant. The space defined in this manner is filled with a liquid crystal and a constant cell gap distance is maintained with the aid of a spacer sprayed prior to an injection of the liquid crystal.

However, the above-mentioned conventional liquid crystal display device has a non-uniform cell gap because the structure of the lower plate 2 coated with the sealant is different at different locations thereof resulting in a step coverage. In particular, the cell gap distances at a gate link area and a data link area are relatively small.

Figure 2:
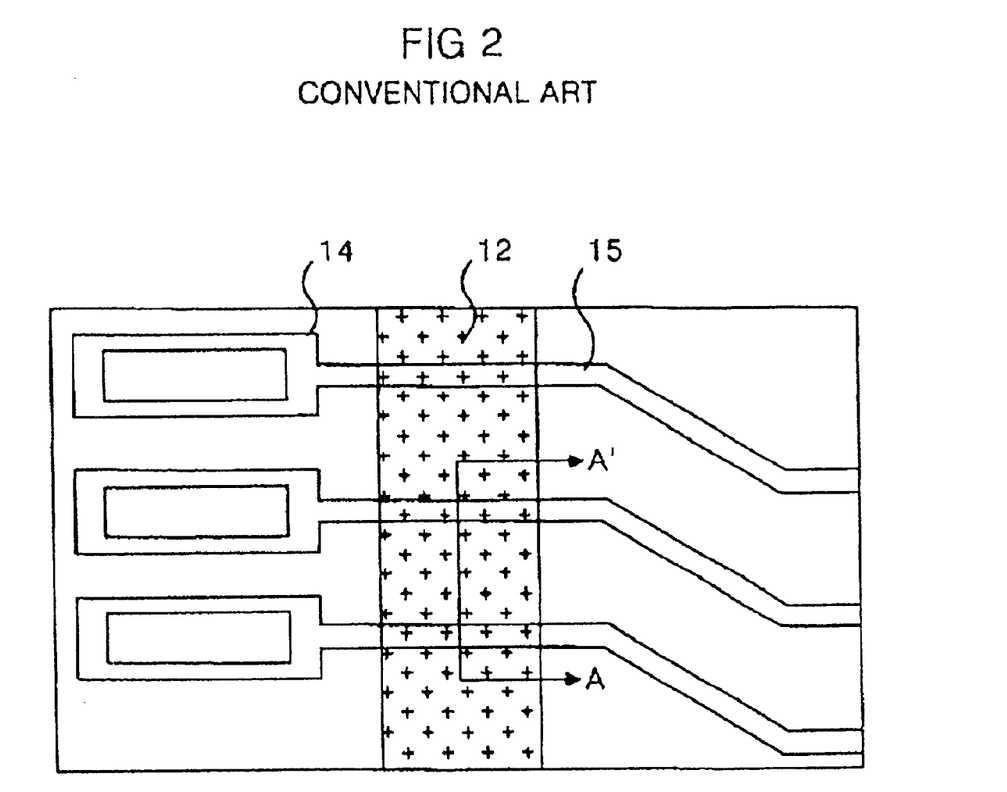
FIG. 2 is an enlarged plan view of the gate link area shown in FIG. 1.
Figure 3:
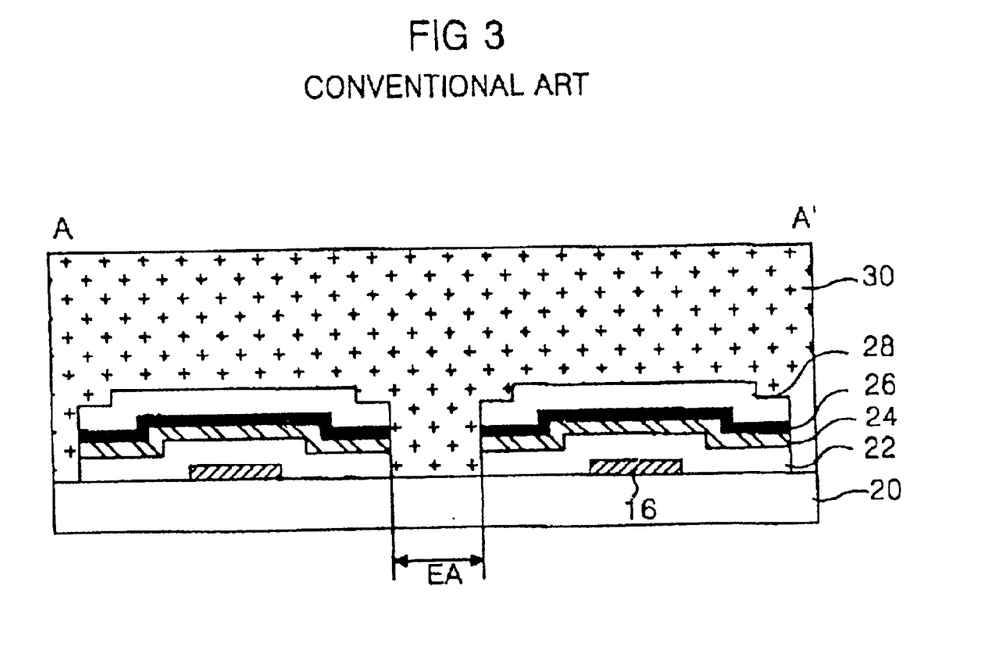
FIG. 3 is a section view of the seal part taken along the line A–A' in FIG. 2.

Problems associated with the conventional device will be described with reference to FIGS. 2–6. FIG. 2 is an enlarged view of the gate link area crossing the seal part 12 in FIG. 1, and FIG. 3 is a section view of the seal part taken along the line A–A' in FIG. 2. A gate link part 15 extending from a gate pad 14 consists of a gate link electrode 16, a gate insulating layer 22, an amorphous silicon layer 24, an amorphous silicon layer 26 doped with an impurity, hereinafter referred to as "n+layer", and a protective film 28 disposed thereon. The gate link electrode 16 is formed integrally with the gate pad 14 and the gate line by depositing a gate metal material on the transparent substrate 20 and thereafter patterning it. The gate insulating layer 22, the amorphous silicon layer 24 and the n+layer 26 are sequentially formed on the transparent substrate 20 provided with the gate link electrode 16. Thereafter, the n+layer 26 is patterned and then the protective film 28 is formed thereon. In order to prevent problems such as an electrical short and crosstalk through the amorphous silicon layer 24 between the gate pads 14 and between the gate links 15, the gate insulating film 22, the amorphous silicon layer 24, the n+layer 26 and the protective film 28 are etched simultaneously to expose the transparent substrate 20. A sealant 30 is coated in a direction crossing the gate link part 15. In this case, since step coverage is generated at etched areas EA between the gate link parts 15, it is impossible to obtain a desired cell gap by the sealant 30.

Figure 4:
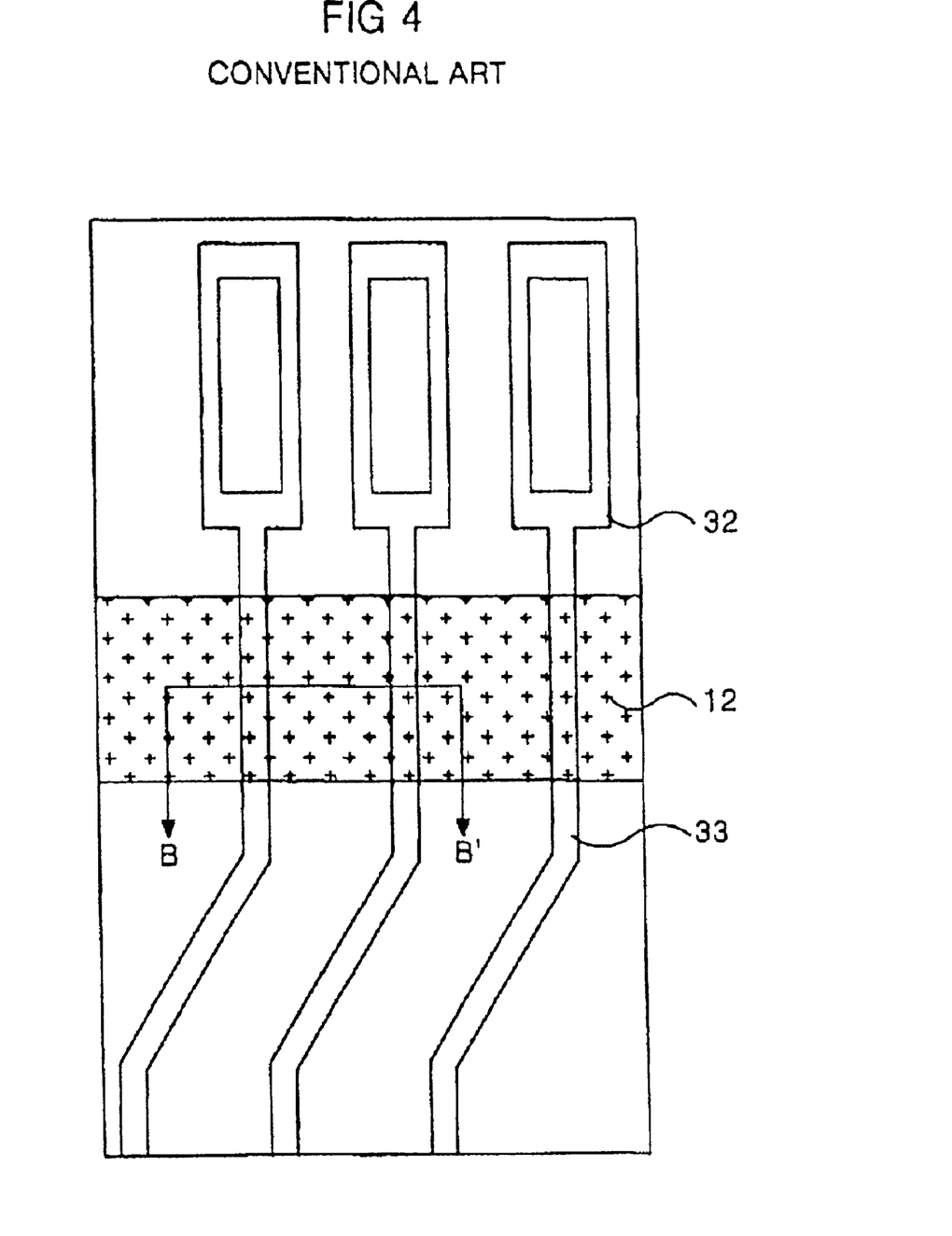
FIG. 4 is an enlarged plan view of the data link area shown in FIG. 1.
Figure 5:
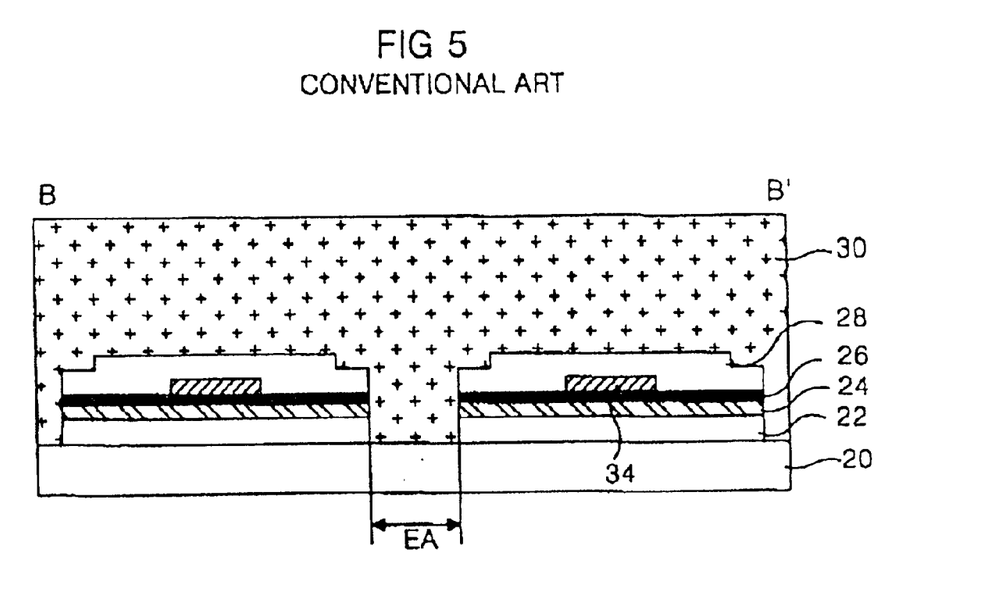
FIG. 5 is a section view of the seal part taken along the line B–B' in FIG. 4.

FIG. 4 is an enlarged view of the data link area crossing the seal part 12 in FIG. 1, and FIG. 5 is a section view of the seal part 12 taken along the line B–B' in FIG. 4. A data link part 33 extending from a data pad 32 comprises a gate insulating layer 22, an amorphous silicon layer 24, an "n+layer" 26, a data link electrode 34 and a protective film 28 disposed on a transparent substrate 20. The data link electrode 34 is formed integrally with the data pad 32 and the data line by depositing a data metal material and patterning it after sequentially forming the gate insulating film 22, the amorphous silicon layer 24 and the n+layer 26 and patterning the n+layer 26. A protective film 28 is provided on the data link electrode 34. In order to prevent problems such as an electrical short and crosstalk through the amorphous silicon layer 24 between the data pads 32 and between the data link part 33, the gate insulating film 22, the amorphous silicon layer 24, the n+layer 26 and the protective film 28 are etched simultaneously to expose the transparent substrate 20. A sealant 30 is coated in a direction crossing the data link part 33. In this case, since a step coverage is generated at etched areas EA between the data link parts 33, it is impossible to obtain a desired cell gap by the sealant 30 coated in a direction crossing the data link part 33.

Figure 6:
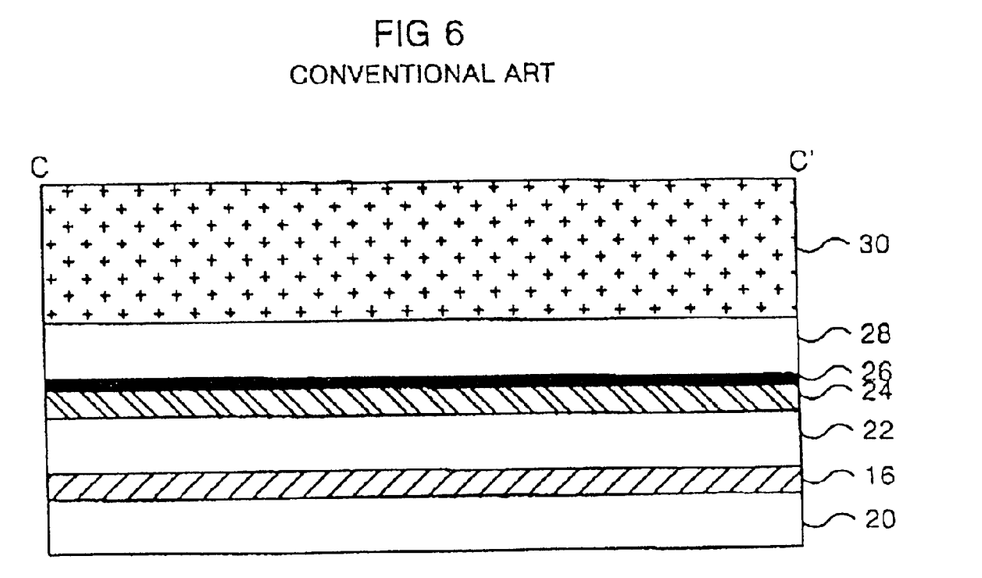
FIG. 6 is a section view of the liquid crystal area taken along the line C–C' in FIG. 1.

FIG. 6 is a cut-away section view of a liquid crystal area, which is located at the opposite side of the gate link area in the picture display part 10, taken along the line C–C' in FIG. 1. The liquid crystal area arranged with a plurality of signal wires, such as common electrode lines comprises a gate metal layer 16, a gate insulating film 22, an amorphous silicon layer 24, a n+layer 26 and a protective film 28 that are sequentially disposed on a transparent substrate 20. A sealant 30 is coated on the protective film 28.

In the conventional liquid crystal display device as described above, a step coverage exists in the etching areas between the link parts at the gate link area and the data link area, whereas a step coverage does not exist in the liquid crystal area located at the opposite side of the link area. Thus, when the sealant is coated to have a constant cell gap on a basis of the protective film which is an uppermost layer of the link area and the liquid crystal area, the sealant coated on the link area has a lower height than the sealant coated on the etched area having a step coverage. As a result, the conventional liquid crystal display device has a problem in that, since the height of the sealant is different depending on a position thereof, it has an irregular cell gap to cause a non-uniform brightness.

SUMMARY OF THE INVENTION

Accordingly, the present invention is directed to a liquid crystal display device and fabricating method thereof that substantially obviates one or more of the problems due to limitations and disadvantages of the related art.

An advantage of the present invention is a liquid crystal display device and a fabricating method thereof in which step coverage at a link area is compensated by a dummy pattern so as to provide a more uniform cell gap.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes at least one dummy pattern formed between the gate links and between the data links, the gate links and data links being coated with the sealant.

In another aspect of the present invention, a method of fabricating a liquid crystal display device includes forming at least one dummy pattern between gate links and between data links along with the gate links and the data links, said gate links and data links being coated with the sealant.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 7:
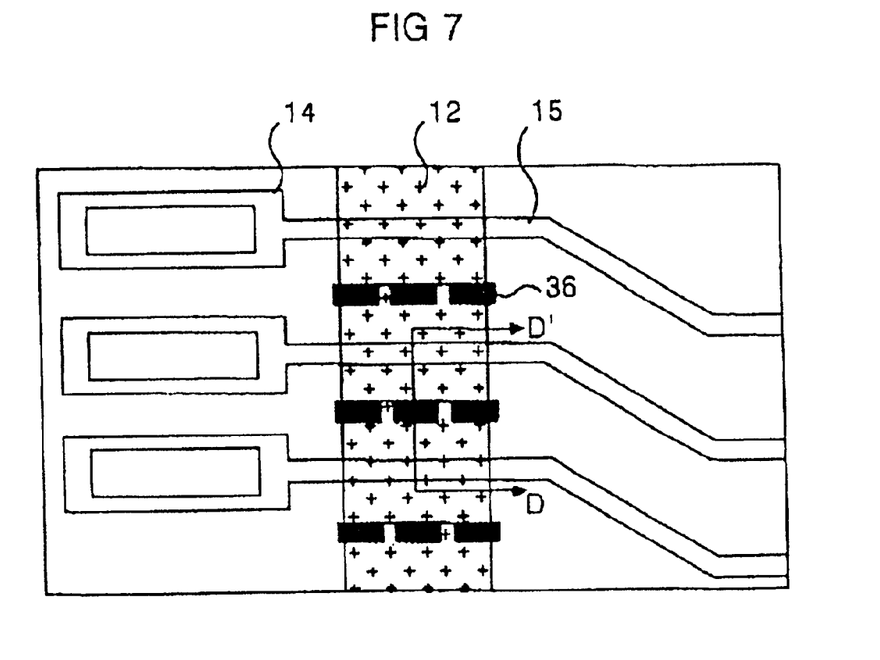
FIG. 7 is a plan view showing a structure of a gate link area in a liquid crystal display device according to an embodiment of the present invention.
Figure 8:
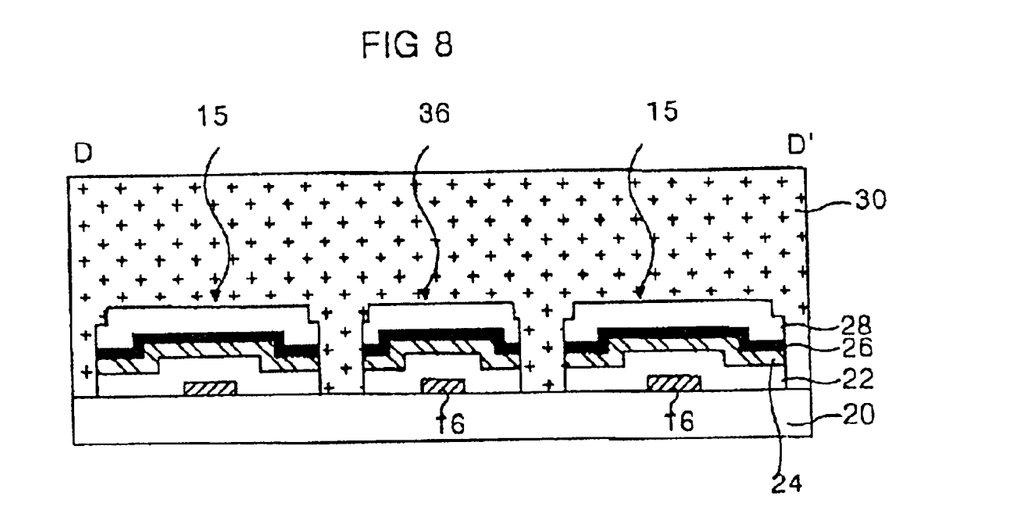
FIG. 8 is a section view of the seal part taken along the line D–D' in FIG. 7.

FIG. 7 is a plan view showing a structure of a gate link area in a liquid crystal display device according to an embodiment of the present invention, and FIG. 8 is a section view of the seal part 12 taken along the line D–D' in FIG. 7. Referring to FIG. 7, a plurality of dummy patterns 36 are formed at an etched area between gate links 15. These dummy patterns 36 preferably have a vertical structure similar to the gate links 15. In other words, each of the gate links 15 and the dummy patterns 36 comprises a gate metal layer 16, a gate insulating layer 22, an amorphous silicon layer 24, an n+layer 26 and a protective film 28 that are formed on a transparent substrate 20, as shown in FIG. 8. By virtue of such dummy patterns 36, an etched area EA (see FIG. 3) having a step coverage from the gate links 15 is reduced. For instance, a distance between the gate links 15 at the etched area EA in the conventional gate link area is a large value of about 100 $\mu$m, whereas a distance between a gate link 15 and a dummy pattern 36 at the etched area EA in the gate link area of the present invention is a significantly reduced distance of about 10 $\mu$m. As a result, since a sealant 30 can be coated on the gate link area to have a desired height by virtue of the dummy pattern 36 similar to the liquid crystal area shown in FIG. 6, a constant cell gap between the upper and lower plates can be obtained. In particular, if a distance between the gate link 15 and the dummy pattern 36, that is, a width of the etched area EA is made equal, then an excellent cell gap uniformity can be obtained.

Figure 9:
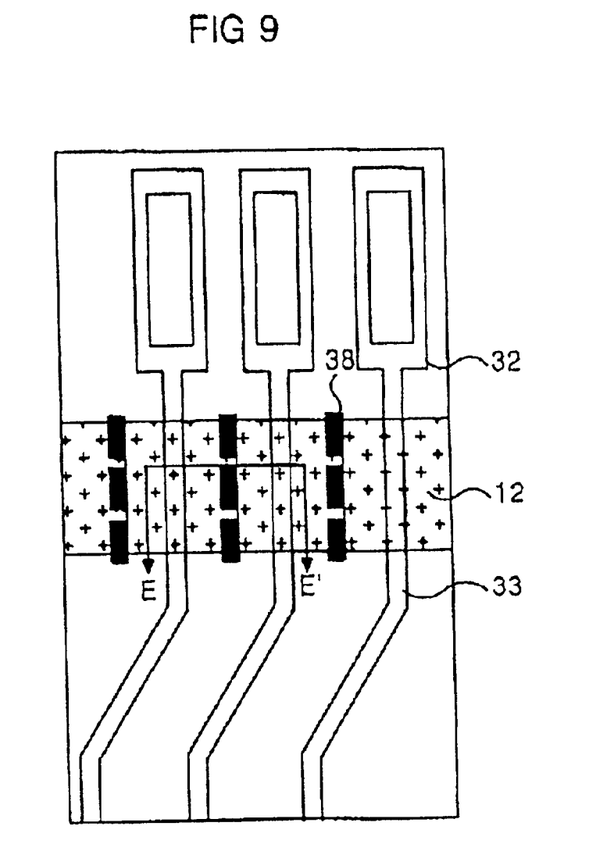
FIG. 9 is a plan view showing a structure of a data link area in a liquid crystal display device according to an embodiment of the present invention.
Figure 10:
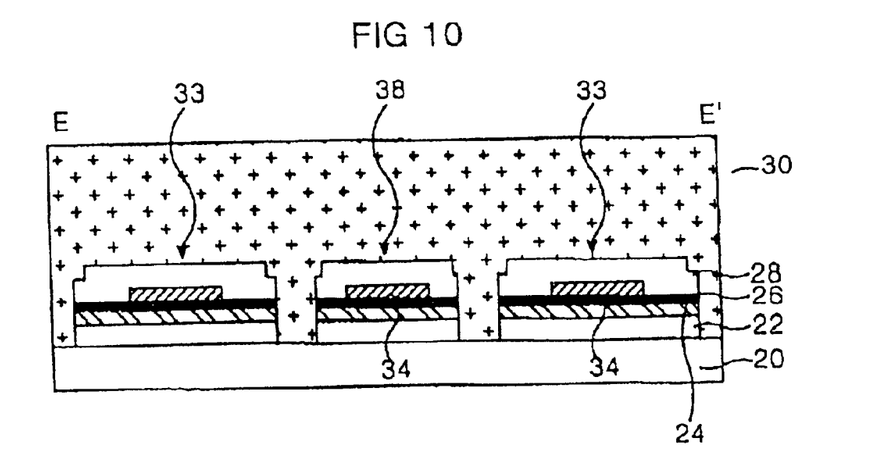
FIG. 10 is a section view of the seal part taken along the line E–E' in FIG. 9.

FIG. 9 is a plan view showing a structure of a data link area in a liquid crystal display device according to an embodiment of the present invention, and FIG. 10 is a section view of the seal part 12 taken along the line E–E' in FIG. 9. Referring to FIG. 9, a plurality of dummy patterns 38 are formed at an etched area between data links 33. These dummy patterns 38 have a vertical structure similar to the data links 33. In other words, each of the data links 33 and the dummy patterns 38 includes a gate insulating layer 22, an amorphous silicon layer 24, an n+layer 26 and a protective film 28 that are formed on the transparent substrate 20 as shown in FIG. 10. Since an etched area EA having a step coverage from the data link 33 is reduced by virtue of such dummy patterns 38, a sealant 30 can be coated to a desired height similar to the liquid crystal area shown in FIG. 6. As a result, the sealant 30 provides a constant cell gap between the upper and lower substrates or plates. In particular, if a distance between a data link 33 and a dummy pattern 38 (i.e., a width of the etched area EA) is made equal, then an excellent cell gap uniformity can be obtained.

A method of fabricating a liquid crystal display device according to the embodiment of the present invention will be described with reference to FIG. 8 and FIG. 10. First, a gate metal material is deposited on the transparent substrate 20 and then patterned to form the gate line extending from the gate pad 14 and the gate link 15. Accordingly, the gate metal layer 16 included in the dummy pattern 36 at the gate link area is formed. The gate insulating layer 22, the amorphous silicon layer 24 and the n+layer 26 are sequentially formed on the transparent substrate 20 provided with the gate metal layer 16. Thereafter, the n+layer 26 is patterned to form an ohmic contact layer of the thin film transistor. A data electrode material is deposited on the n+layer 26 and then patterned to form the data metal layer 34 which is extended from the data pad 32 and the data link 33 to form the data line. The data metal layer 34 is included in the dummy pattern 38 at the data link area. Next, the protective film 28 is formed on the entire lower plate. Then, the protective film 28, the n+layer 26, the amorphous silicon layer 24 and the gate insulating film 22 are patterned and simultaneously etched to expose the transparent substrate 20 so as to prevent problems such as an electrical short and crosstalk through the amorphous silicon layer 24 and the n+layer 26 between the gate metal layers 16 and the data metal layers 34. Thus, the gate and data links 15 and 33 and the dummy patterns 36 and 38 shown in FIG. 8 and FIG. 10, respectively, are formed on the transparent substrate 20. Subsequently, a transparent electrode material is deposited and then patterned to form the pixel electrode. In turn, a sealant is coated along the gate link area, the data link area and the liquid crystal area at the opposite side thereof in a constant height to attach with the upper plate prepared separately and provide a constant cell gap. A spacer is sprayed and a liquid crystal is injected after attaching the upper plate to the lower plate. Then, a liquid crystal injecting hole is sealed, to thereby complete the liquid crystal display device.

Figure 11:
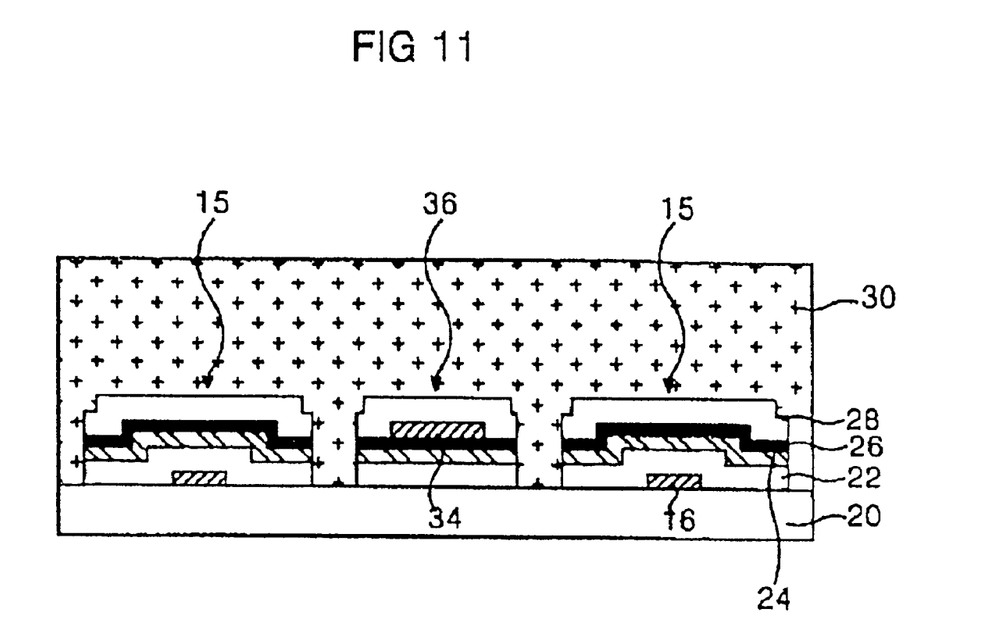
FIG. 11 is a section view showing another structure of the dummy pattern shown in FIG. 8.

FIG. 11 shows another structure of the dummy pattern 36 inserted into the gate link area in FIG. 7. The dummy pattern 36 shown in FIG. 11 has a vertical structure identical to the above-mentioned data link 33. More specifically, the dummy pattern 36 comprises the gate insulating film 22, the amorphous silicon layer 24, the n+layer 26, the data metal layer 34 and the protective film 28 that are formed on the transparent substrate 20. Such dummy patterns 36 are preferably formed to have an equal distance from the gate links 15, so that the sealant 30 can be coated on the gate link area with a desired height.

Figure 12:
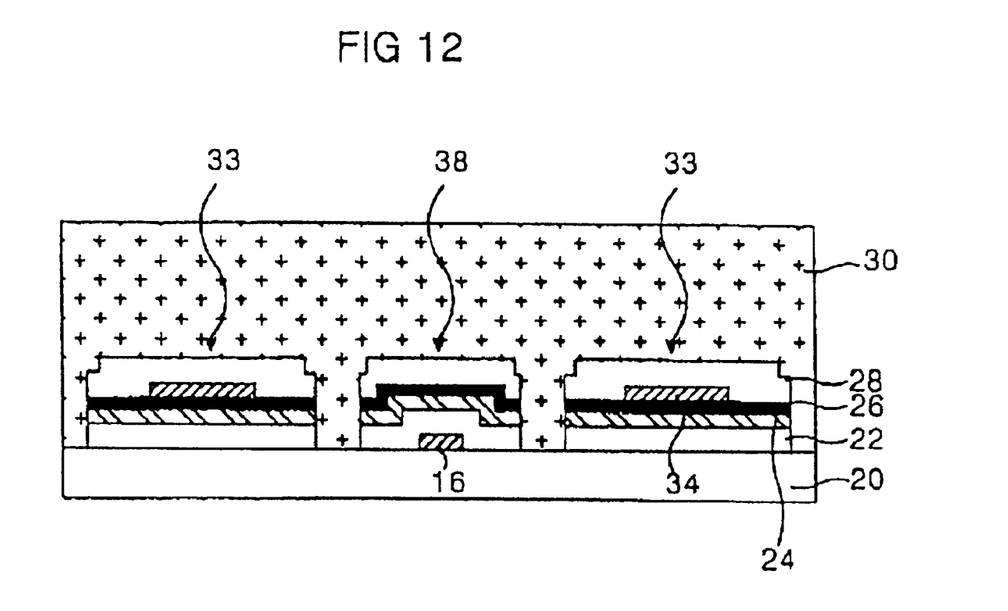
FIG. 12 is a section view showing another structure of the dummy pattern shown in FIG. 10.

FIG. 12 shows another structure of the dummy pattern 38 inserted into the data link area in FIG. 9. The dummy pattern 38 shown in FIG. 12 has a vertical structure identical to the above-mentioned gate link 15. More specifically, the dummy pattern 38 comprises the gate metal layer 16, the gate insulating film 22, the amorphous silicon layer 24, the n+layer 26, and the protective film 28 that are formed on the transparent substrate 20. Such dummy patterns 38 are preferably formed to have an equal distance from the data links 33, so that the sealant 30 can be coated on the gate link area with a desired height.

A method of fabricating the liquid crystal display device according to another embodiment of the present invention will be described below with reference to FIG. 11 and FIG. 12. First, a gate metal material is deposited on the transparent substrate 20 and then patterned to form the gate line extending from the gate pad 14 and the gate link 15 and also form the gate metal layer 16 included in the dummy pattern 38 at the data link area. The gate insulating layer 22, the amorphous silicon layer 24 and the n+layer 26 are sequentially formed on the transparent substrate 20 provided with the gate metal layer 16, and thereafter the n+layer 26 is patterned to form an ohmic contact layer of the thin film transistor. A data electrode material is deposited on the n+layer 26 and then patterned to form the data metal layer 34 which is extended from the data pad 32 and the data link 33 to form the data line and included in the dummy pattern 36 at the gate link area. Next, the protective film 28 is formed on the entire lower plate. Thereafter, the protective film 28, the n+layer 26, the amorphous silicon layer 24 and the gate insulating film 22 are patterned and simultaneously etched to expose the transparent substrate 20. This prevents problems such as an electrical short and crosstalk through the amorphous silicon layer 24 and the n+layer 26 between the gate metal layers 16 and the data metal layers 34. Thus, the gate and data links 15 and 33 and the dummy patterns 36 and 38 shown in FIG. 11 and FIG. 12, respectively, are formed on the transparent substrate 20. Subsequently, a transparent electrode material is deposited and then patterned to form the pixel electrode. In turn, the sealant is coated along the gate link area, the data link area and the liquid crystal area at the opposite side thereof in a constant height to attach with the upper plate prepared separately and provide a constant cell gap. Finally, a spacer is sprayed and liquid crystal is injected after attaching the upper plate to the lower plate. Then, a liquid crystal injecting hole is sealed, to thereby complete the liquid crystal display device.

As described above, according to the present invention, a dummy pattern is inserted between the gate links and the data links, so that the gate and data link areas are coated with a sealant to have the same height as the liquid crystal area at the opposite side thereof. Accordingly, the uniformity of cell gap can be obtained to prevent non-uniformity of brightness caused by an irregular or non-uniform cell gap.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising: a gate electrode, a gate pad and gate links on a substrate;
   first dummy patterns between the gate links;
   a gate insulating film on the gate electrode and the gate link;
   a semiconductor layer on the gate insulating film;
   a source electrode, a drain electrode, a data pad and data links on the semiconductor layer;
   a protective film on the source and drain electrodes and the data link;
   a sealant on the gate links and the data links; and
   a pixel electrode on the protective film,
   wherein the first dummy patterns have the same vertical structure as any one of the gate links and the data links and are located in the same layer as the gate links and the data links, and
   wherein the first dummy patterns are spaced from the gate links by a substantially similar distance to cross entirely the sealant in a direction parallel to the gate links.

2. The device of claim 1, wherein the gate links and the first dummy patterns have a same height.

3. The device of claim 1, wherein each of the gate links includes the gate electrode, the gate insulation film, the semiconductor layer, and the protective film.

4. The device of claim 1, further comprising a sealant on the gate links and the data links.

5. The device of claim 1, further comprising second dummy patterns between the data links;
   wherein the second dummy patterns are spaced from the data links by a substantially similar distance to cross entirely the sealant in a direction parallel to the data links.

6. The device of claim 5, wherein the data links and the second dummy patterns have a same height.

7. The device of claim 5, wherein each of the data links includes the source and drain electrodes, the gate insulation film, the semiconductor layer, and the protective film.

8. The device of claim 1, wherein the semiconductor layer includes a doped semiconductor layer.

9. A method of fabricating a liquid crystal display device, comprising:

forming a gate electrode, a gate pad and gate links on a substrate;

forming first dummy patterns between the gate links;

forming a gate insulating film on the gate electrode and the gate link;

forming a semiconductor layer on the gate insulating film;

forming a source electrode, a drain electrode, a data pad and data links on the semiconductor layer;

forming a protective film on the source and drain electrodes and the data link;

forming a sealant on the gate links and the data links; and forming a pixel electrode on the protective film, wherein the first dummy patterns are formed into the same vertical structure as any one of the gate links and the data links and simultaneously with any one of the gate links and the data links, and wherein the first dummy patterns are spaced from the gate links by a substantially similar distance to cross entirely the sealant in a direction parallel to the gate links.

10. The method of claim 9, wherein the gate links and the first dummy patterns have a same height.

11. The method of claim 9, wherein each of the gate links includes the gate electrode, the gate insulation film, the semiconductor layer, and the protective film.

12. The method of claim 9, further comprising the step of forming a sealant on the gate links and the data links.

13. The method of claim 9, further comprising the step of forming second dummy patterns between the data links, the second dummy patterns are spaced from the data links by a substantially similar distance to cross entirely the sealant in a direction parallel to the data links.

14. The method of claim 13, wherein the data links and the second dummy patterns have a same height.

15. The method of claim 13, wherein each of the data links includes the source and drain electrodes, the gate insulation film, the semiconductor layer, and the protective film.

16. The method of claim 9, wherein the semiconductor layer includes a doped semiconductor layer.

17. A method of fabricating a liquid crystal display device, comprising:

forming a gate electrode, a gate pad and gate links on a substrate;

forming first dummy patterns between the gate links;

forming a gate insulating film a semiconductor layer on the gate electrode and the gate link;

forming a source electrode, a drain electrode, a data pad and data links on the semiconductor layer;

forming a protective film on the source and drain electrodes and the data link;

patterning the gate insulating film, the semiconductor layer, and the protective film;

forming a sealant on the gate links and the data links; and forming a pixel electrode on the protective film, wherein the first dummy patterns are formed into the same vertical structure as any one of the gate links and the data links and simultaneously with any one of the gate links and the data links, wherein the first dummy patterns are spaced from the gate lines by a substantially similar distance to cross entirely the sealant in a direction parallel to the gate links.

18. The method of claim 17, wherein the gate links and the first dummy patterns have a same height.

19. The method of claim 17, wherein each of the gate links includes the gate electrode, the gate insulation film, the semiconductor layer, and the protective film.

20. The method of claim 17, further comprising the step of forming a sealant on the gate links and the data links.

21. The method of claim 17, further comprising the step of forming second dummy patterns between the data links, wherein the first dummy patterns are spaced from the data lines by a substantially similar distance to cross entirely the sealant in a direction parallel to the data links.

22. The method of claim 21, wherein the data links and the second dummy patterns have a same height.

23. The method of claim 21, wherein each of the data links includes the source and drain electrodes, the gate insulation film, the semiconductor layer, and the protective film.

24. The method of claim 17, wherein the semiconductor layer includes a doped semiconductor layer.

25. The device of claim 5, wherein the second dummy patterns are formed into the same vertical structure as any one of the gate links and the data links.

26. The method of claim 13, wherein the second dummy patterns are formed into the same vertical structure as any one of the gate links and the data links.

27. The method of claim 21, wherein the second dummy patterns are formed into the same vertical structure as any one of the gate links and the data links.

* * * * *